(12) United States Patent
Nakamura et al.

(10) Patent No.: US 9,033,623 B2
(45) Date of Patent: May 19, 2015

(54) TOOL RADIUS ADJUSTING METHOD IN MACHINE TOOL AND MACHINE TOOL FOR PRACTICING THE METHOD

(75) Inventors: Eiji Nakamura, Nagoya (JP); Norikazu Sawaki, Chiryu (JP); Harumi Sawaki, legal representative, Chiryu (JP); Shun Sawaki, legal representative, Chiryu (JP); Aya Sawaki, legal representative, Chiryu (JP); Taku Sawaki, legal representative, Chiryu (JP); Akihiko Kadota, Chiryu (JP); Takashi Yokoyama, Seto (JP); Yasuhiro Komai, Takahama (JP)

(73) Assignee: JTEKT CORPORATION, Osaka-shi (JP)

( * ) Notice: Subject to any disclaimer, the term of this patent is extended or adjusted under 35 U.S.C. 154(b) by 572 days.

(21) Appl. No.: 13/509,911

(22) PCT Filed: Nov. 10, 2010

(86) PCT No.: PCT/JP2010/069983
§ 371 (c)(1),
(2), (4) Date: Jul. 26, 2012

(87) PCT Pub. No.: WO2011/058989
PCT Pub. Date: May 19, 2011

(65) Prior Publication Data
US 2013/0064616 A1 Mar. 14, 2013

(30) Foreign Application Priority Data

Nov. 16, 2009 (JP) .................................. 2009-261399

(51) Int. Cl.
*B23B 29/034* (2006.01)
*B23B 35/00* (2006.01)

(52) U.S. Cl.
CPC ......... *B23B 29/03421* (2013.01); *Y10T 408/03* (2015.01); *Y10T 408/85* (2015.01);

(Continued)

(58) Field of Classification Search
CPC ............ B23B 29/034; B23B 29/03403; B23B 29/03421; B23B 29/03432; B23B 29/03457; B23B 29/03489; B23B 29/03492; B23B 35/00
USPC .................. 408/1 R, 13, 147, 148, 149, 153; 82/1.11, 1.2, 1.4; 29/26 A, 26 R
See application file for complete search history.

(56) References Cited

U.S. PATENT DOCUMENTS 3,208,312 A * 9/1965 Heuser .............................. 82/1.2
3,715,167 A * 2/1973 Ollearo ......................... 408/149

(Continued)

FOREIGN PATENT DOCUMENTS

JP 58 126006 7/1983
JP 61 241007 10/1986

(Continued)

OTHER PUBLICATIONS

International Search Report issued on Jan. 11, 2011 in PCT/JP10/069983 filed on Nov. 10, 2010.

*Primary Examiner* — Daniel Howell
(74) *Attorney, Agent, or Firm* — Oblon, McClelland, Maier & Neustadt, L.L.P.

(57) ABSTRACT

At a contact step in a tool radius adjusting method, a reference portion of a movable body provided radially movably on a housing of a boring tool and a position adjusting reference member fixed on a machine tool are brought into contact by sliding the movable body relative to the housing so that the position of a cutting blade comes to a predetermined position in a direction to go away from a rotational axis. Then, at an adjusting step, the position of the cutting blade relative to the rotational axis is adjusted by changing the relative position between a tool spindle holding the boring tool and the position adjusting reference member in a direction to come close to each other by drive mechanisms of the machine tool used for positioning a spindle head with the tool spindle relative to a workpiece in machining the workpiece with the cutting blade.

5 Claims, 8 Drawing Sheets

(52) U.S. Cl.
CPC .......... *B23B 35/00* (2013.01); *B23B 29/03489* (2013.01); *B23B 29/03403* (2013.01); *B23B 29/03425* (2013.01); *B23B 2250/04* (2013.01); *B23B 2270/025* (2013.01); *B23B 2270/027* (2013.01); *B23B 2270/48* (2013.01)

(56) References Cited

U.S. PATENT DOCUMENTS

| | | | | |
|---|---|---|---|---|
| 4,486,130 A | * | 12/1984 | Lipp | 408/181 |
| 4,552,493 A | * | 11/1985 | Schultshick | 408/3 |
| 4,581,808 A | * | 4/1986 | Lawson et al. | 29/558 |
| 6,705,184 B2 | * | 3/2004 | Cardemon et al. | 82/1.11 |
| 7,029,209 B2 | * | 4/2006 | Cardemon et al. | 408/1 R |
| 7,272,877 B2 | * | 9/2007 | Cardemon et al. | 29/26 A |
| 8,881,354 B2 | * | 11/2014 | Nakamura et al. | 29/26 R |
| 2011/0116880 A1 | | 5/2011 | Nakamura et al. | |

FOREIGN PATENT DOCUMENTS

| | | |
|---|---|---|
| JP | 2001 062613 | 3/2001 |
| JP | 2003 311517 | 11/2003 |
| JP | 2004 148481 | 5/2004 |
| JP | 2007 283469 | 11/2007 |

* cited by examiner

TOOL RADIUS ADJUSTING METHOD IN MACHINE TOOL AND MACHINE TOOL FOR PRACTICING THE METHOD

TECHNICAL FIELD

The present invention relates to a tool radius adjusting method for a boring tool in a machine tool with the boring tool which is adjustable in tool radius and further to a machine tool with a boring tool which is adjustable in tool radius.

BACKGROUND ART

Heretofore, as boring holders being adjustable in tool radius, there are those described in, for example, JP2007-283469A, JP2004-148481A, JP2003-311517A, and JP2001-62613A. These boring holders have a mechanism for manually adjusting the tool radius or a mechanism for adjusting the tool radius by controlling the pressure of fluid.

SUMMARY OF THE INVENTION

Problem to be Solved by the Invention

It has been desired to automatize adjusting the tool radius of a boring holder. As mentioned earlier, heretofore, it has been known to automatically adjust the tool radius by controlling the pressure of fluid.

The present invention takes an object to provide a new tool radius adjusting method in a machine tool and a new machine tool that are capable of automatically adjusting the tool radius differently from the prior art automatic adjusting method.

Measures for Solving the Problem (Tool Radius Adjusting Method in Machine Tool)

The present invention relating to a tool radius adjusting method in a machined tool is a tool radius adjusting method in a machine tool which comprises a boring holder main body provided with a housing and a movable body supported on the housing to be slidable relative to the housing in a direction to cross a rotational axis direction and having a reference portion; a cutting blade attached to the movable body; a tool spindle rotatably supported on a spindle head and holding the housing; a position adjusting reference member provided to be changeable in relative position to the tool spindle and provided to be contactable with the reference portion of the movable body; and drive means used for positioning the spindle head relative to a workpiece in machining the workpiece with the cutting blade; the method comprising a contact step of sliding the movable body relative to the housing so that the position of the cutting blade comes to a predetermined position in a direction to go away from the rotational axis, to bring the reference portion of the movable body and the position adjusting reference member into contact and an adjusting step of, after the contact step, changing the relative position between the tool spindle and the position adjusting reference member by the drive means in a direction to come close to each other to adjust the position of the cutting blade relative to the rotational axis.

That is, the state that the position of the cutting blade has been moved to the predetermined position in the direction to go away from the rotational axis and that the reference portion of the movable body and the position adjusting reference member are held in contact is taken as a reference state, and from this reference state, the relative position between the tool spindle and the position adjusting reference member is changed in the direction to come close to each other. As a result, the position of the cutting blade relative to the rotational axis is adjusted by making the position of the cutting blade relative to the rotational axis come close to the same from the reference state. In this way, to establish the reference state, the movable body is provided with the reference portion, and the position adjusting reference member is provided newly. By the method like this, it is possible to adjust the tool radius automatically.

Further, the adjustment of the tool radius is done in a machining area.

Then, the drive means used for the positioning of the spindle head such as, for example, drive means composed of ball screws and motors, is utilized in adjusting the tool radius. Accordingly, it is possible to adjust the tool radius without using dedicated drive means.

Further, in the present invention, the movable body may be slidden by the supply of fluid relative to the housing in a direction in which the position of the cutting blade goes away from the rotational axis, and at the contact step, the movable body may be slidden by the supply of fluid relative to the housing so that the position of the cutting blade comes to the predetermined position in the direction to go away from the rotational axis. That is, the position of the cutting blade is moved to the predetermined position in the direction to go away from the rotational axis by using fluid supplied from a fluid supply device. Thus, the contact step can be realized easily.

Further, in the present invention, the fluid may be air, a clearance may be formed between the movable body and the housing, and at the adjusting step, the fluid that, in adjusting the position of the cutting blade relative to the rotational axis, has been supplied to slide the movable body relative to the housing in the direction in which the position of the cutting blade goes away from the rotational axis may be discharged to the outside through the clearance.

That is, where fluid is used to move the cutting blade to the predetermined position in the direction to go away from the rotational axis at the contact step, the supplied fluid is discharged through the clearance formed between the movable body and the housing at the contact step and the adjusting step. This results in providing an air purge function of preventing the entering of cutting blades and the like through the clearance.

Further, in the present invention, the housing may be provided with a fluid receiving port which is supplied from the outside with the fluid used for sliding the movable body, the machine tool may be provided with an adjusting unit which comprises the position adjusting reference member and a fluid supply device for supplying the fluid to the fluid receiving port, and the tool radius adjusting method may further comprise a coupling step of coupling the fluid supply device to the fluid receiving port of the housing before the contact step. Thus, the adjustment of the tool radius can be done reliably even where the fluid supply device is provided independently of the boring holder which is composed of the housing, the movable body and the cutting blade.

(Machine Tool)

The present invention relating to a machine tool is a machine tool which comprises a boring holder provided with a housing and a movable body supported on the housing to be slidable relative to the housing in a direction to cross a rotational axis direction and having a reference portion; a cutting blade attached to the movable body; a tool spindle rotatably supported on a spindle head and holding the housing; a position adjusting reference member provided to be changeable in relative position to the tool spindle and provided to be contactable with the reference portion of the movable body; drive means being able to change the relative position between the tool spindle and the position adjusting reference member and used for positioning the spindle head relative to a workpiece in machining the workpiece with the cutting blade; and a control device for controlling the drive means to control the relative position between the tool spindle and the position adjusting reference member; wherein in the state that the position of the cutting blade comes to a predetermined position in a direction to go away from the rotational axis and that the reference portion of the movable body and the position adjusting reference member are held in contact, the control device controls the drive means to adjust the position of the cutting blade relative to the rotational axis by changing the relative position between the tool spindle and the position adjusting reference member in a direction to come close to each other.

Thus, substantially the same effects as those of the invention relating to the aforementioned tool radius adjusting method can be achieved. Further, in the invention relating to the machine tool, other features in the tool radius adjusting method can be applied substantially likewise, in which case the same effects can be achieved.

FORM FOR PRACTICING THE INVENTION

Hereinafter, embodiments to which a boring holder according to the present invention is concretized will be described with reference to the drawings.
  <First Embodiment>
  (Construction of Boring Holder)

Figure 1:
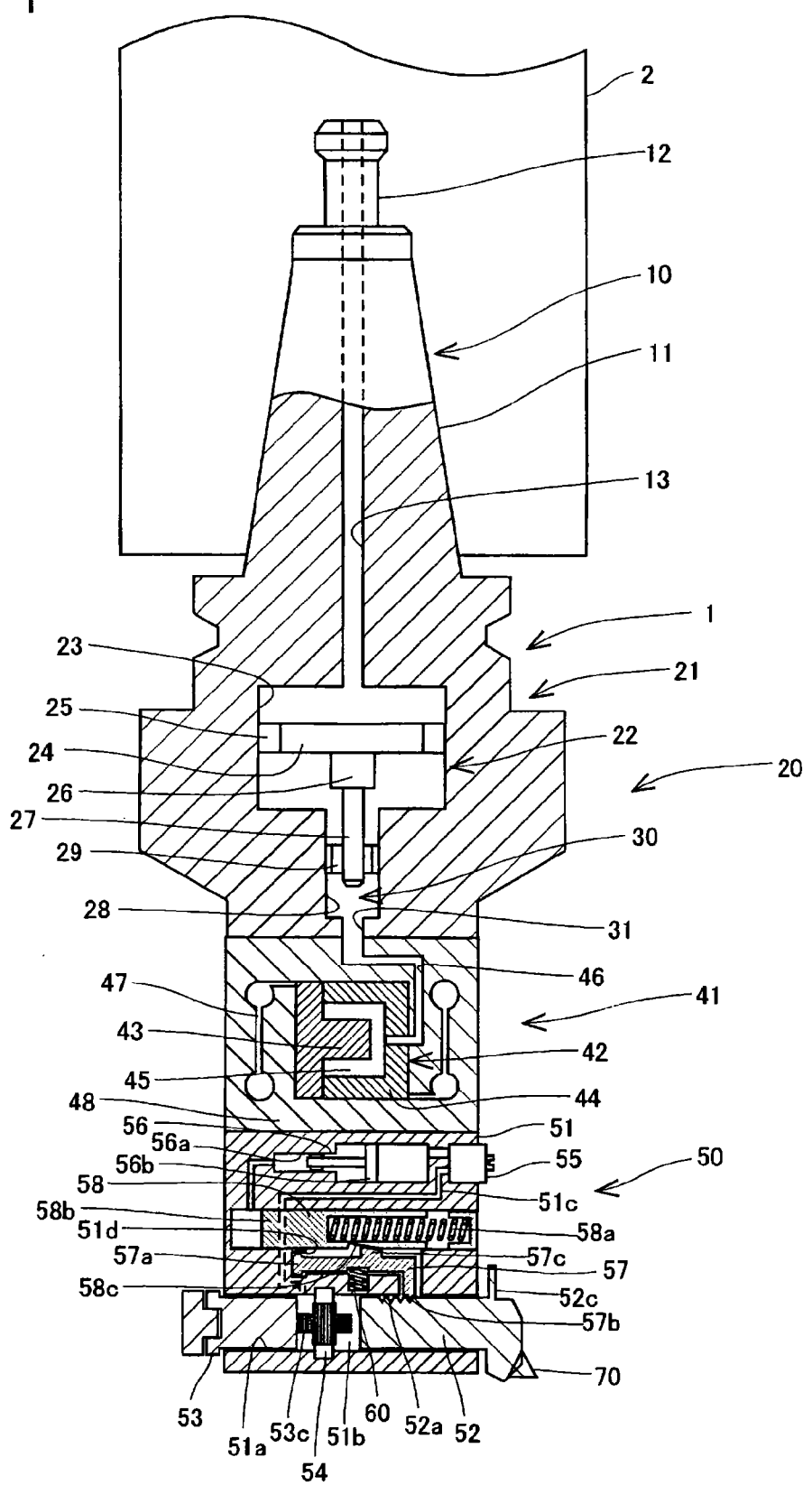
[FIG. 1] is a partial sectional view in an axial direction of a boring holder in a first embodiment.

The construction of a boring holder 1 in a first embodiment will be described with reference to FIGS. 1-3. As shown in FIG. 1, the boring holder 1 is a tool which is held in a tool spindle 2 being rotatable about its axis for machining bores and the like in a workpiece, and is capable of adjusting its tool radius. In each of the figures, a tool spindle 2 side of the boring holder 1 will be referred to as base end side, whereas a side with a cutting blade 70 thereon of the boring holder 1 will be referred to as distal end side.

The boring holder 1 is provided with a holder portion 10, a fine motion adjusting mechanism 20, a coarse motion adjusting mechanism 50, and the cutting blade 70. The holder portion 10, the fine motion adjusting mechanism 20 and the coarse motion adjusting mechanism 50 constitute a boring holder main body.

The holder portion 10 is provided with a taper shank portion 11 formed to a taper shape which becomes narrower toward the base end side, and a pull stud 12 provided at an extreme base end of the taper shank portion 11. The taper shank portion 11 is inserted into a taper hole of the tool spindle 2, and the pull stud 12 is grasped by a collet (not shown) in the tool spindle 2. In this manner, the holder portion 10 is held in the tool spindle 2. Further, an air flow passage 13 extending in the axial direction is formed at the center of the taper shank portion 11. Air is supplied from the tool spindle 2 side to the air flow passage 13. The pressure of the air supplied from the tool spindle 2 side is controlled by a control device (not shown).

The fine motion adjustment mechanism 20 is attached on a distal end side of the holder portion 10 and is a device capable of finely adjusting the position of the cutting blade 70 from the axis, that is, the tool radius. The fine motion adjusting mechanism 20 is provided with a base end body portion 21 (corresponding to "base portion" in the present invention) and an elastic deformation section 41.

The base end body portion 21 is bodily connected to the distal end side of the holder portion 10 and is formed with an air-oil pressure transforming section 22 inside thereof. The air-oil pressure transforming section 22 is constructed as follows. A first cylinder 23 is formed in communication with an distal end side of the air flow passage 13 in the holder portion 10. In the first cylinder 23, a first piston 24 is received to be reciprocatively slidable in the axial direction (the vertical direction as viewed in FIG. 1) through a sliding seal 25. Further, the first piston 24 is connected at a distal end side thereof with a second piston 27 through a connecting rod 26. In a small-diameter second cylinder 28 which is in communication with the distal end side of the first cylinder 23, the second piston 27 is received to be reciprocatively slidable in the axial direction through a sliding seal 29.

An operating oil chamber 30 which is filled with operating oil is formed on a distal end side of the second piston 27. When an air pressure acts on the first piston 24 through the air flow passage 13 in the holder portion 10, the first piston 24 is moved toward the distal end side, and at the same time, the second piston 27 is moved toward the distal end side, whereby the oil pressure in the operating oil chamber 30 is increased. In this way, the air-oil pressure transforming section 22 transforms the air pressure supplied from the air flow passage 13 of the holder portion 10 into the oil pressure and increases the same. A communication passage 31 is formed at the distal end side of the operating oil chamber 30 in communication therewith.

The elastic deformation section 41 is constructed on a distal end side of the base end body portion 21 as follows. A power unit 42 is provided inside the elastic deformation section 41. The power unit 42 is formed with an oil pressure chamber 45 between a convex block 43 and a concave block 44. The oil pressure chamber 45 and the communication passage 31 of the base end body portion 21 are in communication with each other through an oil passage 46 which is formed in a main body of the elastic deformation section 41 and the concave block 44. Further, an S-shaped slit 47 is formed in the elastic deformation section 41. When an oil pressure acts in the oil pressure chamber 45, a fine motion portion 48 on the distal end side of the elastic deformation section 41 is deformed elastically to be shifted toward the left as viewed in FIG. 1 relative to the based end body portions 21 side of the elastic deformation section 41.

The coarse motion adjusting mechanism 50 is attached to the distal end side of the fine motion adjusting mechanism 20 and is a device which is capable of roughly adjusting the position of the cutting blade 70 from the axis, that is, the tool radius. The adjustable amount of the tool radius by the coarse motion adjusting mechanism 50 is greater than that by the fine motion adjusting mechanism 20. The coarse motion adjusting mechanism 50 is provided with a coarse motion housing 51, a coarse motion movable body 52, a counterweight 53, a pinion shaft 54, a fluid receiving port 55, an air-oil pressure transforming section 56, a clamping section 57, and an urging force generating section 58.

The coarse motion housing 51 is attached to the fine motion portion 48 of the elastic deformation section 41 in the fine motion adjusting mechanism 20. That is, when the fine motion portion 48 of the elastic deformation section 41 is shifted in a radial direction, the coarse motion housing 51 is shifted in the radial direction together with the shift motion of the fine motion portion 48.

The coarse motion movable body 52 is formed to take the shape of a generally round pillar. The coarse motion movable body 52 may be formed to take a square or rectangular pillar shape for example without being limited to the round pillar. The cutting blade 70 is provided at a distal end side (a radially outer side of the boring holder 1) of the coarse motion movable body 52. On an external surface of the coarse motion movable body 52, a plurality (four) of grooves 52a which extend in a direction perpendicular to the center axis direction of the round pillar are arranged in a juxtaposed relation in the center axis direction of the round pillar. For example, FIG. 1 shows four grooves 52a. The grooves 52a are not required to be formed over the whole circumference of the round pillar and suffice to be formed within a predetermined phase range. The coarse motion movable body 52 so formed is reciprocatively slidably inserted into one opening side (the right side as viewed in FIG. 1) of a round hole 51a which is formed at a distal end side of the coarse motion housing 51 and which passes through the same in a radial direction. The moving amount (the coarse motion adjusting amount) in the radial direction of the coarse motion movable body 52 relative to the coarse motion housing 51 is greater than the fine motion adjusting amount of the fine motion portion 48 in the elastic deformation section 41 of the fine motion adjusting mechanism 20.

Further, the coarse motion movable body 52 is arranged to orient the grooves 52a on the external surface thereof upward as viewed in FIG. 1 (i.e., toward the base end side of the boring holder 1) and is non-rotatably held not to rotate about its round pillar axis. Further, a movable body rack portion 52b is bodily formed at a round shape base end portion of the coarse motion movable body 52 and extends in the axial direction of the round pillar. The movable body rack portion 52b constitutes a part of a rack-and-pinion mechanism and is in meshing with the pinion shaft 54 referred to later. That is, when the pinion shaft 54 is rotated, the coarse motion movable body 52 is moved in the left-right direction as viewed in FIG. 1.

Further, the coarse motion movable body 52 is provided on its distal end side with a reference portion 52c which protrudes toward the base end side. An outer surface of the reference portion 52c which faces radially outward of the boring holder 1 is formed to be a flat surface whose normal line extends radially of the boring holder 1. The reference portion 52c is always at a position where it is exposed to the outside of the coarse motion housing 51. The reference portion 52c is used in making a coarse motion adjustment and is a member which is brought into contact with a position adjusting reference member 83 provided on a coarse motion adjusting unit 80 referred to later.

The counterweight 53 is for absorbing an ill-balanced load which is built by an eccentric movement of the coarse motion movable body 52. Specifically, the shape and position of the counterweight 53 is set to have an inertia moment which is equivalent to an inertial moment generated by the coarse motion movable body 52 and the cutting blade 70. In the present embodiment, the counterweight 53 is formed to take a generally round pillar as a whole and has a mass which is approximately the same as the mass of the coarse motion movable body 52.

The counterweight 53 has a mechanism capable of adjusting its inertia moment. Specifically, the counterweight 53 is provided with a weight main body 53a and an adjustable weight 53b. The adjustable weight 53b is provided movably by means of, e.g., a screw or the like relative to the weight main body 53a in the sliding direction of the counterweight 53. That is, where the inertia moment including the coarse motion movable body 52 and the cutting blade 70 is changed by, for example, the replacement of the cutting blade 70, the counterweight 53 is able to have an inertia moment equivalent thereto as a whole by adjusting the position of the adjustable weight 53b relative to the weight main body 53a. The counterweight 53 is not limited to the round pillar shape and may be formed to, for example, a square or rectangular pillar.

The counterweight 53 is reciprocatively slidably inserted into the other opening side (the left side as viewed in FIG. 1) of the round hole 51a which is formed to radially pass through the distal end side of the coarse motion housing 51. Then, the counterweight 53 is non-rotatably held by the coarse motion housing 51 not to turn about the round pillar axis. An weight rack portion 53c is bodily formed on a round pillar base end portion of the counterweight 53 and extends in the round pillar axis direction. The weight rack portion 53c constitutes another part of the rack-and-pinion mechanism and is in meshing with the pinion shaft 54 referred to later. Thus, when the pinion shaft 45 is rotated, the counterweight 53 is moved in the left-right direction as viewed in FIG. 1.

The pinion shaft 54 is supported at almost an axial center portion of the round hole 51a which is formed to pass through the distal end side of the coarse motion housing 51, to be rotatable about the rotational axis of the coarse motion housing 51. The pinion shaft 54 is in meshing with the movable body rack portion 52b and the weight rack portion 53c. When the pinion shaft 54 is rotated counterclockwise as viewed in FIG. 3, the movable body rack portion 52b is moved toward the right as viewed in FIG. 3, in other words, the coarse motion movable body 52 is moved radially outward, and the weight rack portion 53c is moved toward the left as viewed in FIG. 3, in other words, the counterweight 53 is moved radially outward in a direction opposite to the moving direction of the coarse motion movable body 52. On the contrary, when the pinion shaft 54 is rotated clockwise, the movable body rack portion 52b is moved toward the left as viewed in FIG. 3, in other words, the coarse motion movable body 52 is moved radially inward, and the weight rack portion 53c is moved toward the right as viewed in FIG. 3, in other words, the counterweight 53 is moved radially inward in a direction opposite to the moving direction of the coarse motion movable body 52. That is, the rotation of the pinion shaft 54 causes the coarse motion movable body 52 and the counterweight 53 to move synchronously in opposite directions.

The fluid receiving port 55 is provided on the outer surface on the base end side of the coarse motion housing 51. The fluid receiving port 55 is brought into a coupling to the coarse motion adjusting unit 80 being outside, and is supplied with pressurized air supplied from the coarse motion adjusting unit 80. Further, the port 55 has a first port and a second port. The first port is a port for supplying air (corresponding to "second fluid" in the present invention) to an air residence chamber 51b side referred to later, whereas the second port is a port for supplying air (corresponding to "first fluid" in the present invention) to the air-oil pressure transforming section 56 side referred to later.

Here, in the coarse motion housing 51, the air residence chamber 51b is formed between the base end (an end portion being inside radially of the boring holder 1) of the coarse motion movable body 52 and the base end (an end portion being inside radially of the boring holder 1) of the counterweight 53. Between the air residence chamber 51b and the first port of the fluid receiving port 55, there is formed an air flow passage 51c which makes both of them communicate with each other. Thus, the coarse motion movable body 52 and the counterweight 53 are operated by the pressurized air supplied from the coarse motion adjusting unit 80 to the air residence chamber 51b. Specifically, when the pressurized air in the air residence chamber 51b is raised by being supplied from the coarse motion adjusting unit 80, the coarse motion movable body 52 is slidden radially outward, that is, in a direction in which the position of the cutting blade 70 goes away from the rotational axis. Simultaneously and synchronously with the movement of the coarse motion movable body 52, the counterweight 53 is slidden radially outward. Further, the air supplied to the air residence chamber 51b is discharged to the outside through a slight clearance formed between the round hole 51a of the coarse motion housing 51 and the coarse motion movable body 52 and also through a slight clearance between the round hole 51a and the counterweight 53.

The air-oil pressure transforming section 56 is formed inside the coarse motion housing 51 and transforms into an oil pressure the air pressure which is supplied from the coarse motion adjusting unit 80 referred to later through the second port of the fluid receiving port 55. The air-oil pressure transforming section 56 is provided with a stepped cylinder 56a formed inside of the coarse motion housing 51 to extend radially and a piston 56b received in the stepped cylinder 56a to be slidable radially reciprocatively. The piston 56b has a large-diameter disc portion and a small-diameter rod portion. In the stepped cylinder 56a, a chamber on the right side as viewed in FIG. 2 of the large-diameter disc portion of the piston 56b is supplied with pressurized air from the fluid receiving port 55. Further, in the stepped cylinder 56a, the left side chamber as viewed in FIG. 2 of the small-diameter rod portion of the piston 56b constitutes an operating oil chamber. Thus, when the pressurized air supplied through the second port of the fluid receiving port 55 acts on the large-diameter disc portion of the piston 56b, the same is moved toward the left in FIG. 2, whereby the oil pressure in the operating oil chamber is boosted. In this way, the air-oil pressure transforming section 56 operates to transform the pressurized air into the pressurized oil and boosts the pressurized oil.

The clamping section 57 comprises an L-shaped lever and is supported in the coarse motion housing 51. The clamping section 57 clamps the position of the coarse motion movable body 52 relative to the coarse motion housing 51 by pressing the external surface of the coarse motion movable body 52.

On the other hand, the clamping section 57 unclamps the position of the coarse motion movable body 52 relative to the coarse motion housing 51 by releasing the pressing on the external surface of the coarse motion movable body 52. Thus, the clamping section 57 serves as a switching lever for switching the clamping and unclamping of the coarse motion movable body 52. The clamping section 57 only performs switching the clamping and unclamping of the coarse motion movable body 52, but does not act to perform the sliding operation of the coarse motion movable body 52. That is, the operation for switching the clamping and unclamping by the clamping section 57 is performed independently of the sliding operation of the coarse motion movable body 52.

The clamping section 57 is provided with a support portion 57a which is located on one end side of the almost L-letter shape and which is substantially pivotably supported by a pivot support portion 51d formed in the coarse motion housing 51, and a claw 57b (pressing portion) which is located on the other end side of the L-letter shape and which is pressed on the external surface of the coarse motion movable body 52 to be engaged with either one of the plurality of grooves 52a. Thus, through the pivot movement about the support portion 57a, the clamping section 57 is operated to be switched into either of a state that the claw 57b is engaged with one of the grooves 52a of the coarse motion movable body 52 (i.e., clamping state) and another state that the claw 57b is disengaged from either of the grooves 52a of the coarse motion movable body 52 (i.e., unclamping state). The clamping section 57 is urged by a first spring 60 arranged in the coarse motion housing 51 in a direction to disengage the claw 57b from the grooves 52a of the coarse motion movable body 52.

Further, an engaging protrusion portion 57c having a taper surface is formed on a base end side (on the side of the urging force generating section 58) of the clamping section 57. The engaging protrusion portion 57c is formed so that in the state shown in FIG. 2, the protruding amount on the right side is smaller than the protruding amount on the left side.

The urging force generating section 58 generates on the clamping section 57 an urging force which acts in a direction (pressing direction) in which the clamping section 57 clamps the coarse motion movable body 52. The urging force generating section 58 is provided with a second spring 58a and an urging member 58b. The second spring 58a is supported at one end of a round hole 51e which is radially formed in the coarse motion housing 51 at almost the center in the rotational axis direction of the boring holder 1.

The urging member 58b is in contact with the other end of the second spring 58a. The urging member 58b takes the form of a generally bottomed cylinder, and the second spring 58a is in contact with a bottom surface of the urging member 58b to urge the same. On the other hand, an operating oil chamber 51f is formed on the side opposite to the second spring 58a of the urging member 58b. The operating oil chamber 51f receives operating oil which is supplied from the operating oil chamber (the chamber on the left side as viewed in FIG. 2 of the small-diameter rod portion of the piston 56b in the stepped cylinder 56a) of the air-oil pressure transforming section 56 through a communication passage 51g. Thus, the urging force of the second spring 58a and the pressure of the operating oil which counter each other are exerted on the urging member 58b, and the position of the same in the sliding direction is determined in dependence on both of them.

Figure 2:
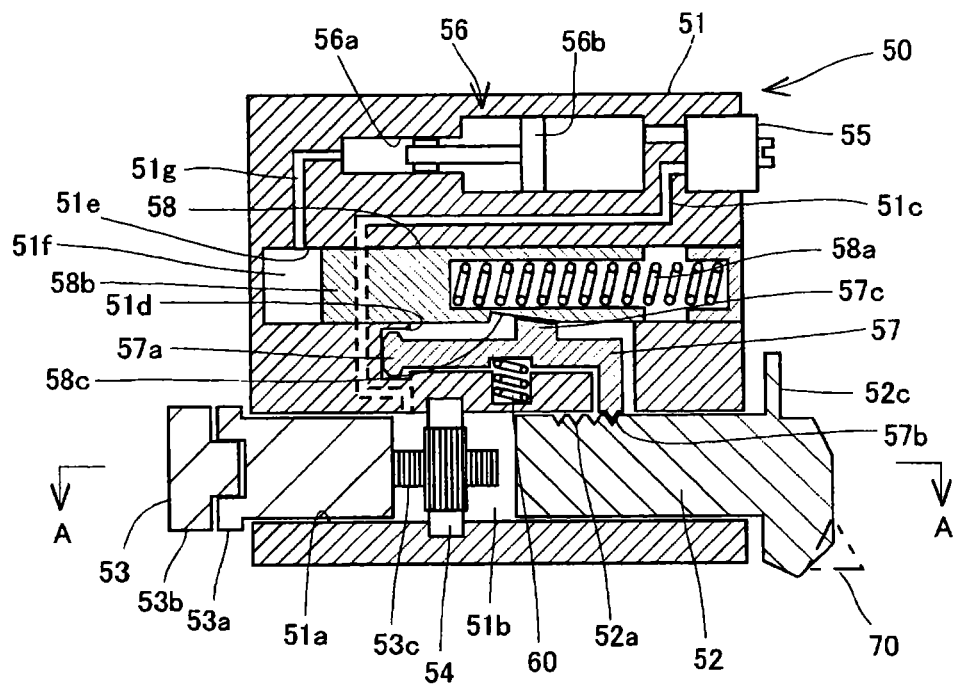
[FIG. 2] is an enlarged sectional view in the axial direction of a coarse motion adjusting mechanism.
Figure 3:
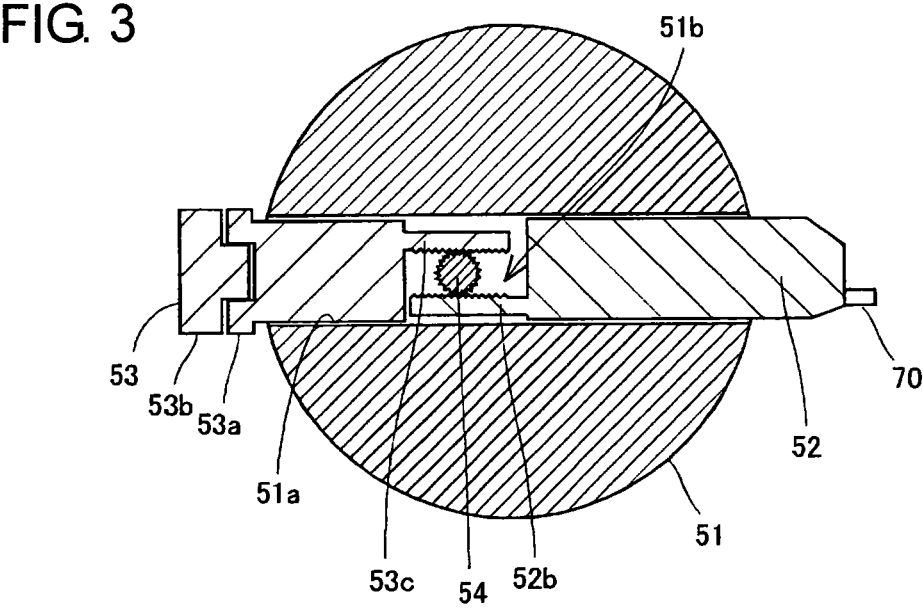
[FIG. 3] is an A-A sectional view in FIG. 2.

The urging member 58b is further formed on the external surface thereof with a taper portion 58c which is reduced in diameter as it goes toward the left as viewed in FIG. 2. The taper portion 58c is not required to be formed over the whole circumference of the urging member 58b and suffices to be formed only in a predetermined phase range. The taper portion 58c is always in contact with an inclined surface on the engaging protrusion portion 57c of the clamping section 57. That is, the taper portion 58c and the engaging protrusion portion 57c of the clamping section 57 are held in wedge engagement. The position where the inclined surface on the engaging protrusion portion 57c of the clamping section 57 is contacted differs in dependence on the sliding position of the urging member 58b. Thus, the urging force with which the clamping section 57 acts in a direction to clamp the coarse motion movable body 52 is adjusted in dependence on the sliding position of the urging member 58b.

(Fine Adjusting Method of Tool Radius by Fine Motion Adjusting Mechanism)

Figure 4:
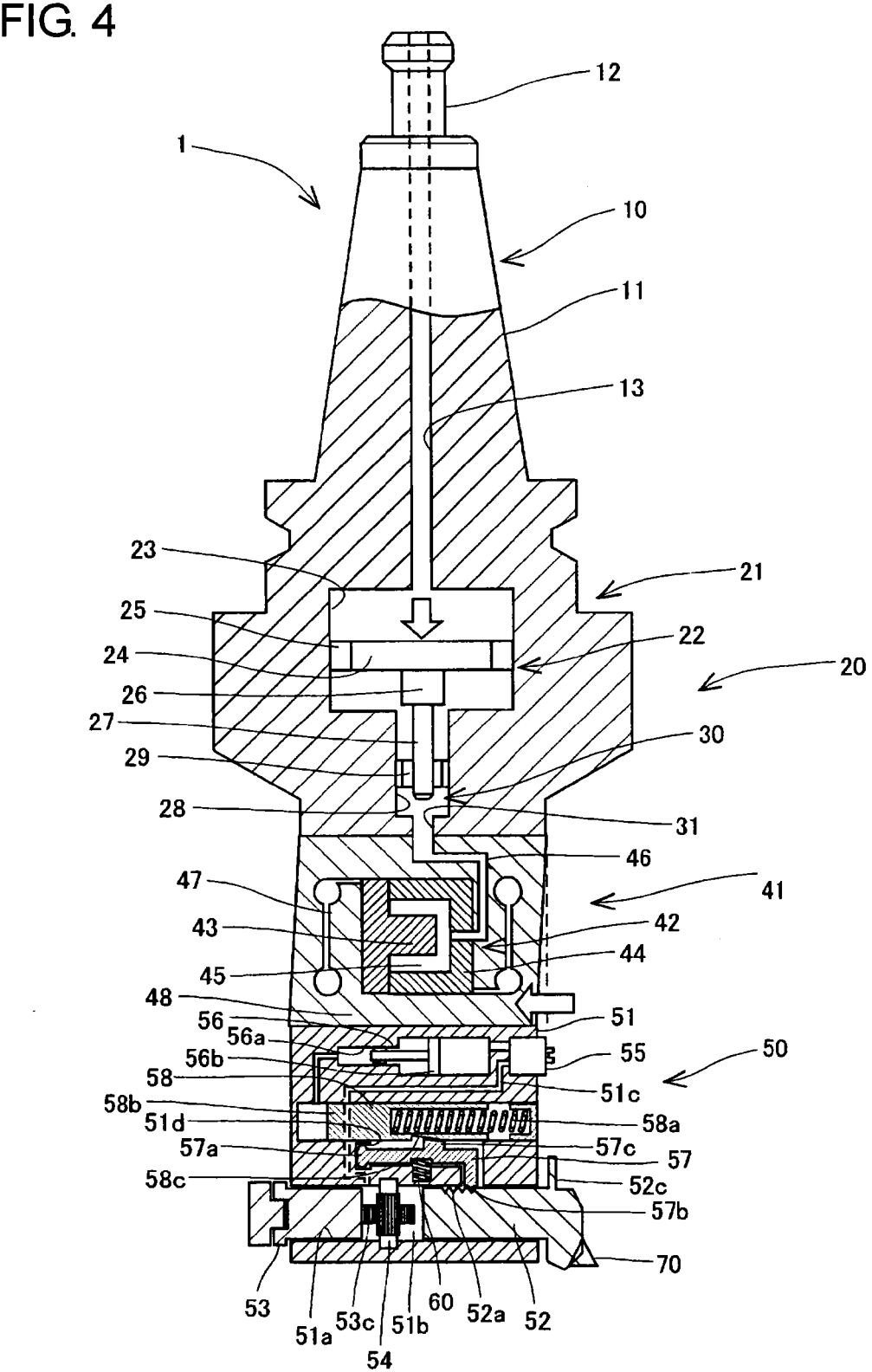
[FIG. 4] is a partial sectional view in the axial direction of the boring holder, showing the state that a fine motion adjusting mechanism has been adjusted.

Next, a fine adjusting method of the tool radius by the fine motion adjusting mechanism will be described in detail with reference to FIGS. 1 and 4. Let it be now assumed that air at a predetermined controlled pressure is supplied from the tool spindle 2 side. Then, the first piston 24 of the air-oil pressure transforming section 22 is slidden toward the distal end side of the boring holder 1 in dependence on the air pressure. With movement of the first piston 24, the second piston 27 is also slidden toward the distal end side of the boring holder 1. The movement of the second piston 27 causes the operating oil filled in the operating oil chamber 30 to increase in pressure. With the increase in the pressure of the operating oil, the oil pressure in the oil pressure chamber 45 of the elastic deformation section 41 is increased through the communication passage 31 and the oil passage 46. As a result, the fine motion portion 48 on the distal end side of the elastic deformation section 41 is shifted toward the left as shown in FIG. 4.

In this way, the fine motion portion 48 of the elastic deformation section 41 is finely moved radially relative to the base end body portion 21, whereby the coarse motion adjusting mechanism 50 which is attached on the fine motion portion 48 side of the elastic deformation section 41 is finely moved as a whole radially relative to the base end body portion 21. That is, the position relative to the rotational axis of the cutting blade 70 attached to the coarse motion movable body 52, in other words, the tool radius is finely adjusted by the operation of the fine motion adjusting mechanism 20.

In altering the amount of the fine motion adjustment, such is carried out by adjusting the pressure of the air supplied from the tool spindle 2 side. Here, the fine motion adjusting mechanism 20 serves to amplify the air pressure supplied from the tool spindle 2 side by the air-oil pressure transforming section 22. Therefore, it is possible to elastically deform the elastic deformation section 41 at a low air pressure. Further, in returning the amount of the fine motion adjustment to zero, such can be done by lowering to zero the air pressure supplied from the tool spindle 2 side. Because the fine motion adjustment by the fine motion adjusting mechanism 20 depends on the elastic deformation of the elastic deformation section 41, the amount of the fine motion adjustment is not so large. Conversely, the fine motion adjusting mechanism 20 is able to perform a very tiny or slight adjustment precisely.

(Coarse Adjusting Method of Tool Radius by Coarse Motion Adjusting Mechanism)

Next, the operation of the coarse motion adjusting mechanism 50 will be described with reference to FIGS. 5 through 10. Since the coarse motion adjusting unit 80 is used in operating the coarse motion adjusting mechanism 50, description will first be made regarding the coarse motion adjusting unit 80.

Figure 5:
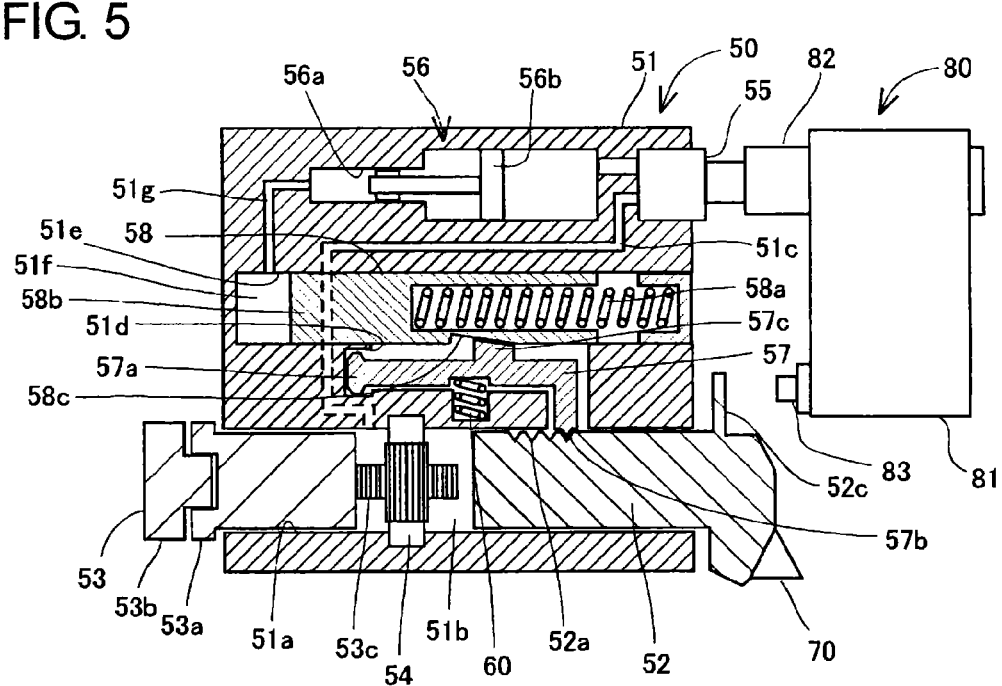
[FIG. 5] is a view showing a coupling step: an operation in the coarse motion adjusting mechanism.

As shown in FIG. 5, the coarse motion adjusting unit 80 is provided with a fluid supply device 81, a fluid supply slidable port 82 and a position adjusting reference member 83. The fluid supply device 81 is a device which is capable of supplying air and controlling the air pressure it supplies. The fluid supply device 81 is fixed on, for example, a bed (not shown) of a machining center. In the present embodiment, for example, in the case of an application to a machining center of the construction that the tool spindle 2 is movable relative to the bed, the fluid supply device 81 of the coarse motion adjusting unit 80 is provided movably relative to the tool spindle 2.

The fluid supply slidable port 82 is a port which is adapted to be coupled to the fluid receiving port 55 of the coarse motion adjusting mechanism 50 and which is able to supply the fluid receiving port 55 with the air supplied from the fluid supply device 81. The fluid supply slidable port 82 is provided slidably relative to the fluid supply device 81 in the left-right direction as viewed in FIG. 5. Further, the fluid supply slidable port 82 is provided with a first coupling port mating with the first port of the fluid receiving port 55 and a second coupling port mating with the second port of fluid receiving port 55. Then, the fluid supply device 81 is able to make a switching between supplying pressurized air from the first coupling port of the fluid supply slidable port 82 and supplying pressurized air from the second coupling port. The position adjusting reference member 83 is secured to the fluid supply device 81 and is provided to be contactable with the reference portion 52c provided on the coarse motion movable body 52.

Next, the adjusting method of the tool radius by the coarse motion adjusting mechanism 50 will be described. First of all, as shown in FIG. 5, the tool spindle 2 and the coarse motion adjusting unit 80 are relatively moved to couple the fluid supply slidable port 82 of the coarse motion adjusting unit 80 and the fluid receiving port 55 of the coarse motion adjusting mechanism 50 (coupling step). More specifically, the first coupling port of the fluid supply slidable port 82 is coupled to the first port of the fluid receiving port 55, and the second coupling port of the fluid supply slidable port 82 is coupled to the second port of the fluid receiving port 55. At this time, the fluid supply slidable port 82 of the coarse motion adjusting unit 80 is held in a state that it has been slidden to the leftmost position as shown in FIG. 5. Further, in this state, the reference portion 52c of the coarse motion movable body 52 is in position to face the position adjusting reference member 83 of the coarse motion adjusting unit 80.

Figure 6:
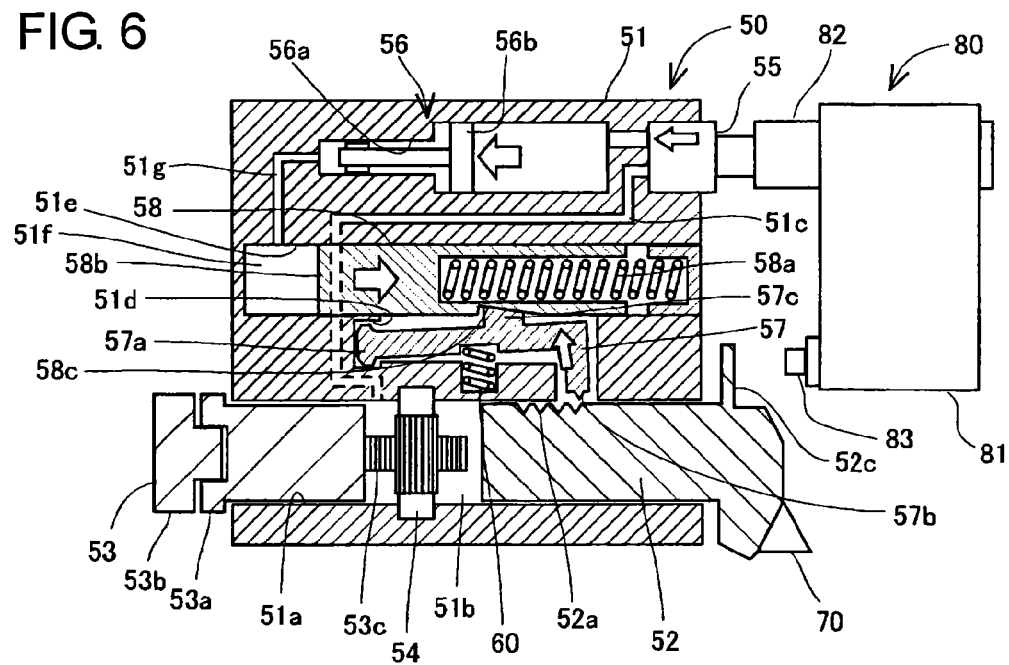
[FIG. 6] is a view showing an unclamping step: an operation in the coarse motion adjusting mechanism.

Then, as shown in FIG. 6, the fluid supply device 81 supplies pressurized air to the right-side chamber of the large-diameter disc portion of the piston 56b in the stepped cylinder 56a of the air-oil pressure transforming section 56 through the second coupling port of the fluid supply slidable portion 82 and through the second port of the fluid receiving portion 55. Thus, the piston 56b of the air-oil pressure transforming section 56 is moved toward the left as viewed in FIG. 6 to raise the oil pressure in the chamber located on the left side as viewed in FIG. 6 of the small-diameter rod portion of the piston 56b in the stepped cylinder 56a as well as in the operating oil chamber 51f. With the pressure rising of the operating oil, the urging member 58b is slidden toward the right as viewed in FIG. 6 against the urging force of the second spring 58a. Thus, the position of the taper portion 58c formed on the external surface of the urging member 58b is slidden toward the right as viewed in FIG. 6. With this, the contactable position between the engaging protruding portion 57c of the clamping section 57 and the taper portion 58c is moved upward as viewed in FIG. 6. Therefore, the urging force of the first spring 60 causes the clamping section 57 to pivot counterclockwise in FIG. 6 about the support portion 57a, whereby the claw 57b is disengaged from one of the grooves 52a on the coarse motion movable body 52. That is, the coarse motion movable body 52 is unclamped from the coarse motion housing 51 (unclamping step). Then, the fluid supply device 81 keeps in a fixed state the air pressure it is supplying to the second coupling port side of the fluid supply slidable port 82.

Figure 7:
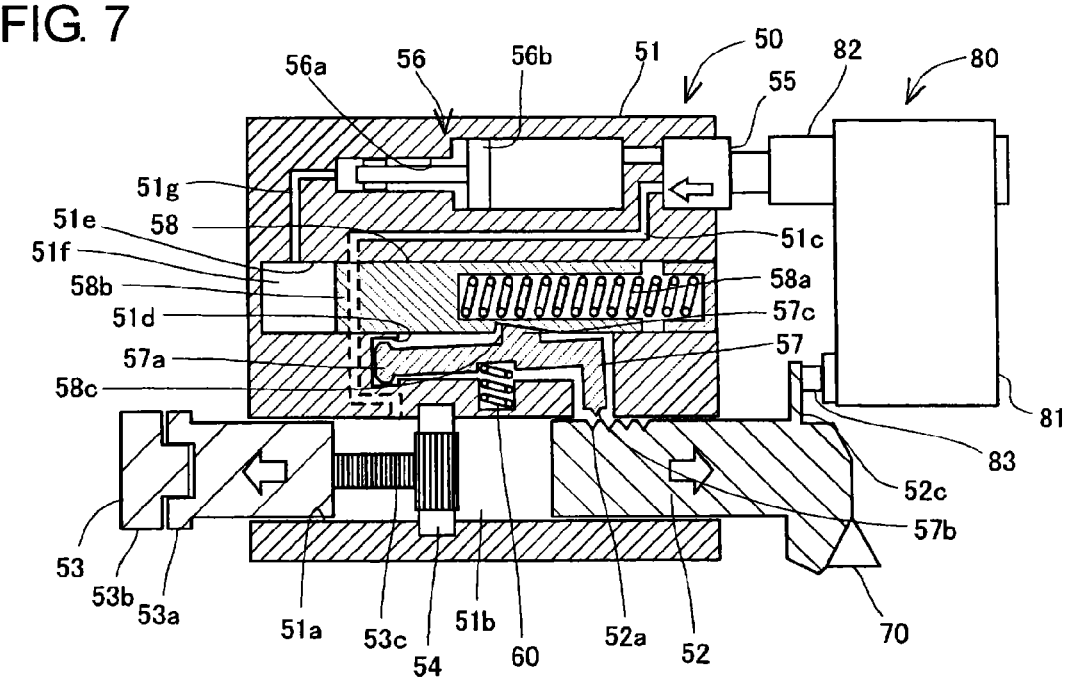
[FIG. 7] is a view showing a contact step: an operation in the coarse motion adjusting mechanism.

Subsequently, as shown in FIG. 7, the fluid supply device 81 supplies pressurized air to the air flow passage 51c through the first coupling port of the fluid supply slidable port 82 and through the first port of the fluid receiving port 55. Thus, the air pressure in the air residence chamber 51b is raised to generate a force which tends to increase the volume of the air residence chamber 51b. That is, with the air pressure rising in the air residence chamber 51b, the coarse motion movable body 52 and the couterweight 53 are slidden in the directions to go away from each other, or radially outward. At this time, the coarse motion movable body 52, the couterweight 53 and the pinion shaft 54 constitute a rack-and-pinion mechanism. Therefore, the radially outward sliding movement of the coarse motion movable body 52 and the radially outward sliding movement of the couterweight 53 are synchronized and linked together. The sliding amount of the coarse motion movable body 52 and the sliding amount of the couterweight 53 are the same.

In this way, with the radially outward sliding of the coarse motion movable body 52, the reference portion 52c of the coarse motion movable body 52 is brought into contact with the position adjusting reference member 83 of the coarse motion adjusting unit 80 (contact step). At this time, the position of the cutting blade 70 has been moved to a predetermined position (e.g., the farthest position) in a direction to go away from the rotational axis of the boring holder 1. That is, in the state that the fluid supply slidable port 82 is at the leftmost position relative to the fluid supply device 81 as viewed in FIG. 7 and has been coupled to the fluid receiving portion 55 and that the reference portion 52c of the coarse motion movable body 52 is in contact with the position adjusting reference member 83, the position of the cutting blade 70 relative to the rotational axis, that is, the tool radius has already been known. This state will be referred to a reference state.

Figure 8:
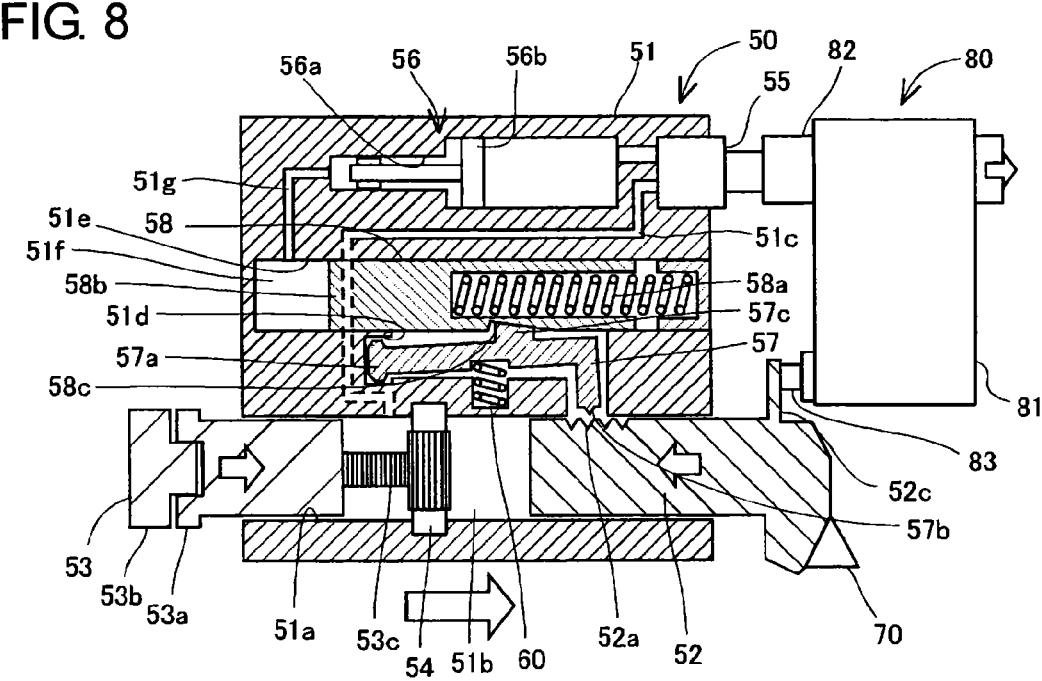
[FIG. 8] is a view showing an adjusting step: an operation in the coarse motion adjusting mechanism.

Subsequently, as shown in FIG. 8, the relative position between the tool spindle 2 and the position adjusting reference member 83 is changed from the reference state in a direction to come close to each other. For example, in a machining center with a drive axis for moving the tool spindle 2, the drive axis is used to move the tool spindle 2 in the direction to come close to the position adjusting reference member 83. Here, the tool radius in the reference state has already been known, and a target tool radius has also been grasped. Therefore, the tool spindle 2 is moved only by the difference between the target tool radius and the tool radius in the reference state in the direction to come close to the position adjusting reference member 83. In this way, the coarse adjustment is made regarding the position of the cutting blade 70 relative to the rotational axis, that is, the tool radius (adjusting step).

At this adjusting step, in adjusting the position of the cutting blade 70 relative to the rotational axis, the air which was supplied to slide the coarse motion movable body 52 relative to the coarse motion housing 51 in the direction that the position of the cutting blade 70 goes away from the rotational axis is exhausted to the outside through the slight clearance formed between each of the coarse motion movable body 52 and the counterweight 53 and the round hole 51a formed in the coarse motion housing 51.

Figure 9:
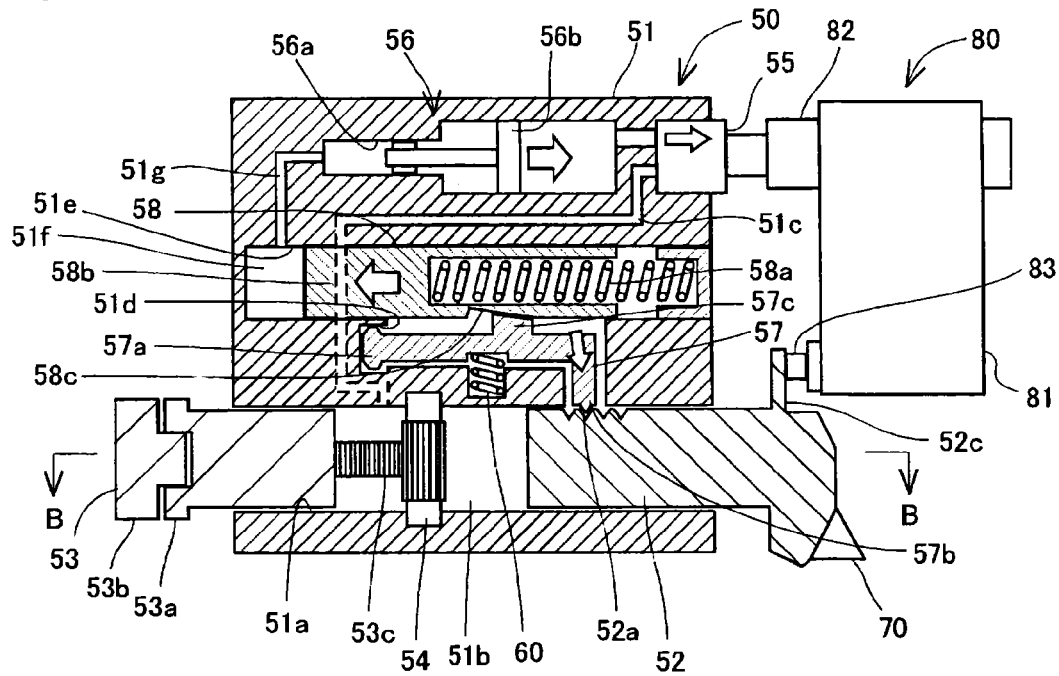
[FIG. 9] is a view showing a clamping step: an operation in the coarse motion adjusting mechanism.
Figure 10:
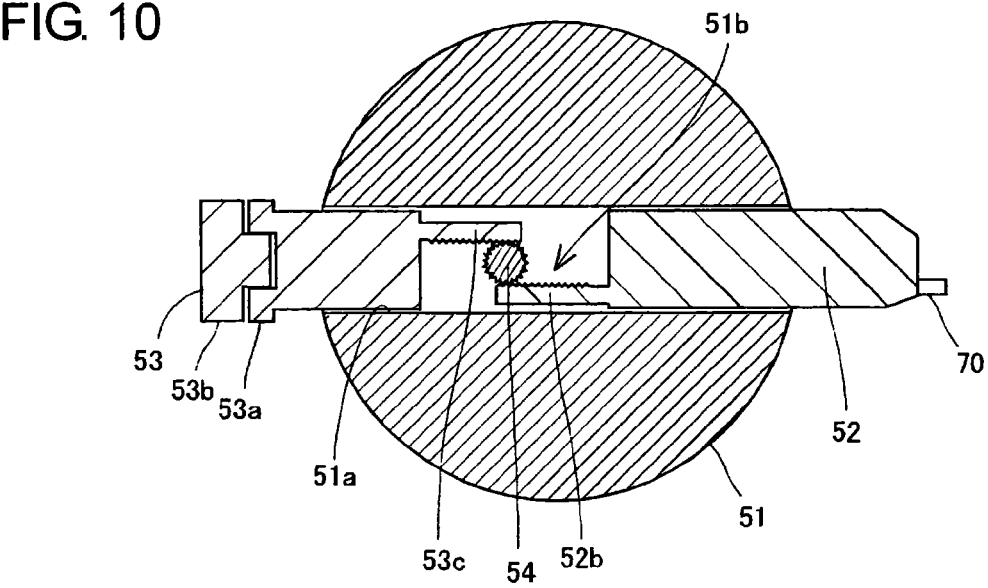
[FIG. 10] is a B-B sectional view in FIG. 9.

Then, as shown in FIGS. 9 and 10, the fluid supply device 81 lowers the air pressure which it has supplied through the second coupling port of the fluid supply slidable port 82 and through the second port of the fluid receiving port 55. Thus, the piston 56b of the air-oil pressure transforming section 56 is moved toward the right as viewed in FIG. 9, and the oil pressure is lowered in the chamber on the left side as viewed in FIG. 9 of the small-diameter rod portion of the piston 56b in the stepped cylinder 56a as well as in the operating oil chamber 51f. With the pressure drop of the operating oil, the urging member 58b is slidden toward the left as viewed in FIG. 9 by means of the urging force of the second spring 58a. Thus, the position of the taper portion 58c formed on the external surface of the urging member 58b is slidden toward the left as viewed in FIG. 9. This results in moving the contactable position between the engaging protruding portion 57c of the clamping section 57 and the taper portion 58c downward as viewed in FIG. 9. Therefore, the clamping section 57 is pivoted clockwise as viewed in FIG. 9 about the support portion 57a against the urging force of the first spring 60, whereby the claw 57b is pressed against the external surface of the coarse motion movable body 52. At this time, the claw 57b is pressed on and engaged with one of the grooves 52a of the coarse motion movable body 52. That is, the coarse motion movable body 52 is clamped on the coarse motion housing 51 (clamping step).

(Specific Application Example in Machining Center)

Figure 11:
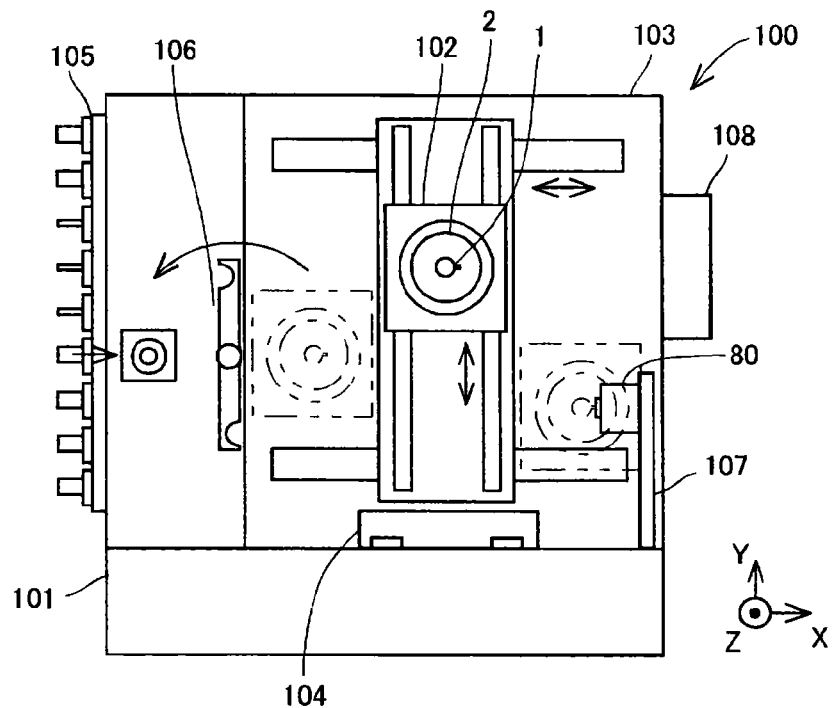
[FIG. 11] is a front view of a machining center, showing the arrangement of a coarse motion adjusting unit.

Next, with reference to FIG. 11, description will be made regarding how the aforementioned coarse adjusting method of the tool radius by the coarse motion adjusting mechanism 50 of the boring holder 1 is carried out in a machining center. As shown in FIG. 11, the machining center 100 is exemplified as a horizontal machining center, wherein a spindle head 102 rotatably supporting a tool spindle 2 is movable relative to a column 103 fixed on a bed 101 in an X-axis direction and a Y-axis direction. Further, a table 104 for mounting a workpiece thereon is movable on the bed 101 in a Z-axis direction. Further, a tool magazine 105 for storing a plurality of tools is provided on the left side of the column 103 as viewed in the front side. In addition, a tool exchange device 106 for exchanging a tool attached in the tool spindle 2 with a tool stored in the tool magazine 105 is provided between the tool magazine 105 and the column 103. In the present embodiment, a next tool to be exchanged by the tool exchange device 106 is moved to a next-tool change position by turning that stored in the tool magazine through 90 degrees. Further, the coarse motion adjusting unit 80 is secured to a support pillar 107 upstanding around the right end of the bed 101. The coarse motion adjusting unit 80 is provided within a machining area in the machining center. Further, a control device 108 is provided on the right side surface of the column 103.

In this case, in carrying out the coarse adjustment of the tool radius by the coarse motion adjusting mechanism 50, first of all, the spindle head 102 is moved in the Y-direction to bring the height along the Y-axis of the fluid receiving port 55 of the coarse motion adjusting mechanism 50 into agreement with the height along the Y-axis of the fluid supply slidable port 82 of the coarse motion adjusting unit 80. Then, the spindle head 102 is moved in the X-axis direction to couple the fluid receiving port 55 to the fluid supply slidable port 82. Subsequently, the unclamping step, the contact step, the adjusting step and the clamping step are carried out in order.

Here, the drive mechanisms for moving the spindle head 102 along the X and Y-axes are those used for positioning in machining the workpiece with the cutting blade 70. Since the coarse motion adjusting unit 80 is arranged within the machining area, the coarse adjustment of the tool radius by the coarse motion adjusting mechanism 50 is carried out by using the drive mechanisms. That is, drive means used for positioning the spindle head 102 such as, for example, drive means composed of ball screws and motors are utilized in the coarse adjustment of the tool radius. Therefore, it is possible to carry out the adjustment of the tool radius without using any dedicated drive means.

(Effects of the Present Embodiment)

In the boring holder 1 described hereinabove, the holder portion 10, the fine motion adjusting mechanism 20, the coarse motion adjusting mechanism 50 and the cutting blade 70 are attached in order from the tool spindle 2 side toward the distal end. Thus, even when the coarse motion movable body 52 is radially moved by the coarse motion adjusting mechanism 50, no movement is given to the fine motion adjusting mechanism 20. That is, the portions radially moved by the coarse motion adjusting mechanism 50 include the coarse motion movable body 52 and the cutting blade 70, but do not include the fine motion adjusting mechanism 20.

Further, the counterweight 53 is configured to be included in the coarse motion adjusting mechanism 50. Therefore, the counterweight 53 suffices to be designed taking the masses of the coarse motion movable body 52 and the cutting blade 70 into consideration, but is not required to be designed taking the mass of the fine motion adjusting mechanism 20 into consideration. In this manner, according to the boring holder 1 in the present embodiment, it is possible to diminish the mass of the counterweight 53. As a result, the mass of the boring holder 1 as a rotational body can be diminished as a whole.

Further, since the counterweight 53 is configured to be adjustable in position relative to the coarse motion housing 51, the occurrence of an eccentric motion can be further suppressed by adjusting the position of the counterweight 53 in dependence on the moving amount of the coarse motion movable body 52. Further, since the counterweight 53 is configured to be moved synchronously with the coarse motion movable body 52 by the same moving amount only as that of the coarse motion movable body 52, it is possible to automatically carry out the position adjustment of the counterweight 53. Further, without providing any dedicated mechanism for clamping the counterweight 53, clamping the coarse motion movable body 52 makes it possible to clamp the counterweight 53 simultaneously.

Further, by making the fine motion adjustment through elastic deformation, it is possible to finely adjust the fine motion adjustment mechanism 20 precisely. Further, the counterweight 53 is configured to be included in the coarse motion adjusting mechanism 50. That is, the aforementioned counterweight 53 is unable to absorb an ill-balanced load produced by an eccentric motion which results from the adjustment of the fine motion adjusting mechanism 20. However, the adjusting amount by the fine motion adjusting mechanism 20 is within the elastic deformation thereof and is very tiny or little. Therefore, by providing the coarse motion adjusting mechanism 50 with the counterweight 53, it is possible as a whole of the boring holder 1 to appropriately absorb the ill-balanced load produced by the eccentric motion.

Further, the clamping/unclamping operation of the clamping section 57 and the sliding operation of the coarse motion movable body 52 are performed as respectively independent operations. That is, the means for sliding the coarse motion movable body 52 uses means which is independent of the operation of the clamping section 57, that is, the fluid supplied from the fluid supply device 81 and the drive section for moving the tool spindle 2 in the present embodiment. In this way, freedom is increased in choosing the means for sliding the coarse motion movable body 52.

Further, in the present embodiment, the switching between the clamping and the unclamping of the coarse motion movable body 52 by the clamping section 57 is performed by the action of the pressurized air supplied from the fluid supply device 81. Particularly, the clamping is done when the clamping section 57 presses the coarse motion movable body 52, whereas the unclamping is done when the clamping section 57 releases the pressing on the coarse motion movable body 52. Thus, it is possible to constitute the clamping section 57 by a very simple means. Further, the clamping is done by pressing the coarse motion movable body 52 by the claw 57b of the clamping section 57. By taking the construction having the claw 57b in this manner, it is possible to constitute the clamping section 57 very easily. Further, the clamping of the coarse motion movable body 52 is done by engaging the claw 57b of the clamping section 57 with either one of the plurality of grooves 52a. This makes it possible to position the coarse motion movable body 52 reliably.

Further, the urging member 58b is slidden in dependence on the urging force of the second spring 58a and the magnitude of the air pressure supplied from the fluid supply device 81 through the second coupling port.

When the urging member 58b is slidden, the clamping section 57 applies to the coarse motion movable body 52 an urging force depending on the sliding position of the urging member 58b. Because the urging member 58b and the clamping section 57 are in wedge engagement, the force of the urging member 58b in the sliding direction is amplified by the wedge engagement to generate the pressing force from the urging member 58b against the clamping section 57. Accordingly, it is possible to generate a strong clamping force from a weak force.

Furthermore, the pressurized air supplied from the fluid supply device 81 is used in sliding the coarse motion movable body 52 as well as in clamping/unclamping the clamping section 57. That is, the pressurized air supplied from the fluid supply device 81 is used for two kinds: the operation of the clamping section 57 and the sliding operation of the coarse motion movable body 52. By performing the operations of two kinds by the use of the single fluid supply device 81, it is possible to realize miniaturization as a whole.

Still further, in adjusting the tool radius by the coarse motion adjusting mechanism, the reference state is set with the position of the cutting blade 70 having been moved to the predetermined position in the direction to go away from the rotational axis and with the reference portion 52c of the coarse motion movable body 52 held in contact with the position adjusting reference member 83, and the relative position between the tool spindle 2 and the position adjusting reference member 83 is changed from the reference state in the direction to come close to each other. As a result, the position of the cutting blade 70 relative to the rotational axis is adjusted by moving the position of the cutting blade 70 from the reference state to come close to the rotational axis. In this way, by providing the coarse motion movable body 52 with the reference portion 52c and by newly providing the position adjusting reference member 83 in order to set the reference state, it becomes possible to adjust the tool radius automatically.

Furthermore, by using the pressurized air supplied from the fluid supply device 81, the position of the cutting blade 70 is brought to the predetermined position (e.g., the furthest position) in the direction to go away from the rotational axis. Thus, it become possible to easily realize the contact step of bringing the reference portion 52c of the coarse motion movable body 52 into contact with the position adjusting reference member 83. Here, where fluid is used for moving the cutting blade to the predetermined position in the direction to go away from the rotational axis at the contact step, the supplied air is exhausted through the slight clearance which is formed between each of the coarse motion movable body 52 and the counterweight 53 and the coarse motion housing 51, at the contact step and the adjusting step. Thus, there is given an air purge function of preventing cutting chips or the like from entering through the slight clearance.

In addition, since the coarse motion adjusting unit 80 and the boring holder 1 are provided as separate devices, it is possible to diminish the mass of the boring holder 1 itself. Even in this case, since the both devices are configured to be coupled, it is possible to adjust the tool radius reliably.

<Second Embodiment>

Figure 12:
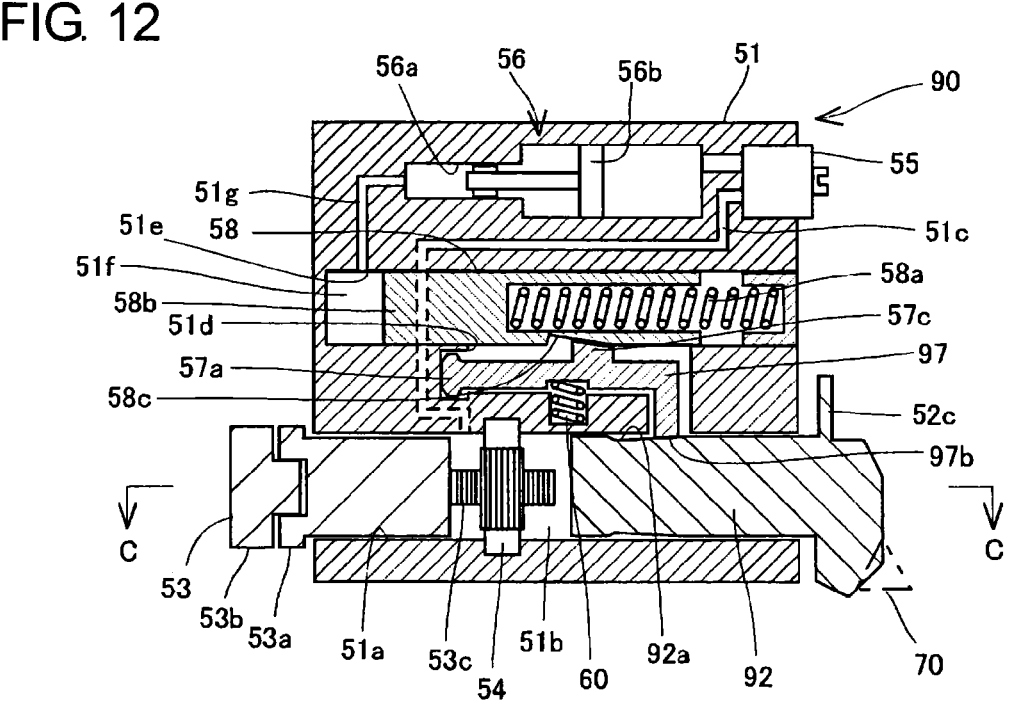
[FIG. 12] is an enlarged sectional view in the axial direction of a coarse motion adjusting mechanism in a second embodiment.
Figure 13:
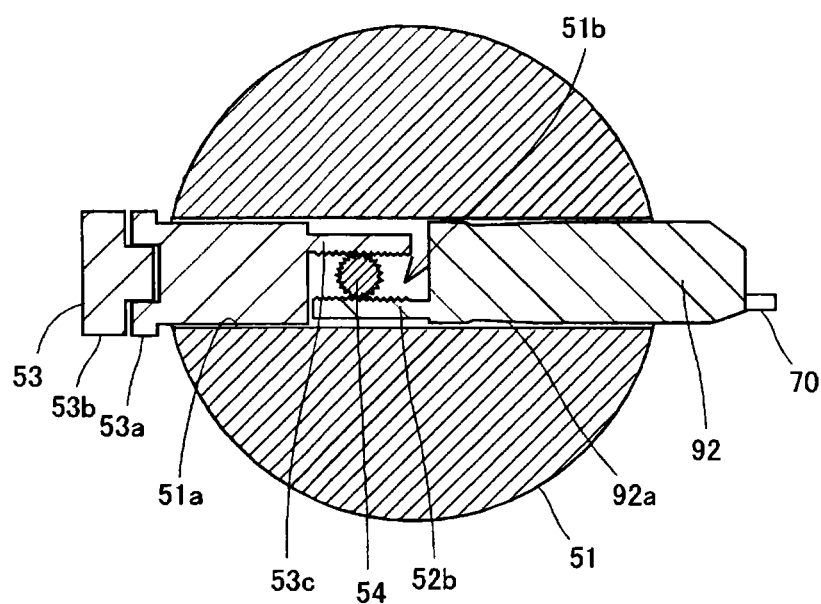
[FIG. 13] is a C-C sectional view in FIG. 12.

A boring holder in a second embodiment will be described with reference to FIGS. 12 and 13. The boring holder in the second embodiment only differs in a coarse motion adjusting mechanism from the boring holder 1 in the first embodiment. Therefore, only the coarse motion adjusting mechanism 90 in the second embodiment will be described hereafter. Of the components of the coarse motion adjusting mechanism 90, some of them are the same as those in the coarse motion adjusting mechanism 50 in the first embodiment, and description regarding the same components will be omitted in exchange for designation by the same reference numerals.

The coarse motion adjusting mechanism 90 in the second embodiment is a device which is attached to the distal end side of the fine motion adjusting mechanism 20 and which is able to coarsely adjust the position of the cutting blade 70 from the rotational axis, that is, the tool radius. The adjustable amount of the tool radius by the coarse motion adjusting mechanism 90 is greater than the adjustable amount of the tool radius by the fine motion adjusting mechanism 20. The coarse motion adjusting mechanism 90 is provided with the coarse motion housing 51, a coarse motion movable body 92, the counterweight 53, the pinion shaft 54, the fluid receiving port 55, the air-oil pressure transforming section 56, a clamping section 97, and the urging force generating section 58. That is, in the coarse motion adjusting mechanism 90 in the second embodiment, the coarse motion movable body 92 and the clamping section 97 only differ from those in the coarse motion adjusting mechanism 50 in the first embodiment.

While the coarse motion movable body 52 in the first embodiment is formed with the plurality of grooves 52a on the external surface thereof, the coarse motion movable body 92 in the second embodiment is not formed with the grooves 52a and instead, is formed to have a taper shape. Specifically, a taper portion 92 on the external surface in a round pillar shape of the coarse motion movable body 92 is formed to be reduced in diameter as it goes from a side (distal end side) on which the cutting blade 70 is attached, toward a base end side (rear end side). That is, of a force in a direction normal to the taper portion 92a, a sliding direction component acting on the coarse motion movable body 92 relative to the coarse motion housing 51 is directed toward the side (rear end side) opposite to the position (distal end) where the cutting blade 70 is provided on the coarse motion movable body 92. Other constructions of the coarse motion movable body 92 are the same as those of the coarse motion movable body 52 in the first embodiment.

While the claw 57b of the clamping section 57 in the first embodiment takes the shape to engage with the grooves 52a, a distal end surface on a pressing portion 97b of the clamping section 97 in the second embodiment is formed to a shape mating to the shape of the taper portion 92a so that the distal end surface is able to press the taper portion 92a on the external surface of the coarse motion movable body 92.

When the clamping section 97 presses and clamps the coarse motion movable body 92, the distal end surface of the pressing portion 97b of the clamping section 97 presses the taper portion 92a on the external surface of the coarse motion movable body 92. At this time, the sliding direction component of the force that acts on the coarse motion movable body 92 by being pressed by the pressing portion 97b is directed to counteract a force exerted by a workpiece during machining. Therefore, even when the coarse motion movable body 92 receives the force from the workpiece during machining, the coarse motion movable body 92 is positioned at a stable position. The taper angle of the taper portion 92a is set to a small angle of the degree that the pressing by the pressing portion 97b on the external surface of the coarse motion movable body 92 does not cause the same to be moved in the sliding direction. Further, because no restrain is imposed on the position where the coarse motion movable body 92 is pressed by the pressing portion 97b, it is possible to arbitrarily set the positioning position of the coarse motion movable body 92 relative to the coarse motion housing 51.

Although in the present embodiment, the external surface of the coarse motion movable body 92 is formed to a taper shape, it may be formed to a cylindrical shape if a sufficient clamping force can be generated with the pressing portion 97b of the clamping section 97 pressing the coarse motion movable body 92. In this case, for a sufficient friction force to be generated, measures may be taken by, for example, implementing a coating treatment on the external surface of the coarse motion movable body 92 and the pressing surface of the clamping section 97.

The invention claimed is:

1. A tool radius adjusting method in a machine tool which comprises:
    a boring holder main body provided with a housing and a movable body supported on the housing to be slidable relative to the housing in a direction to cross a rotational axis direction and having a reference portion;
    a cutting blade attached to the movable body;
    a tool spindle rotatably supported on a spindle head and holding the housing;
    a position adjusting reference member provided to be changeable in relative position to the tool spindle and provided to be contactable with the reference portion of the movable body; and
    at least one drive mechanism used for positioning the spindle head relative to a workpiece in machining the workpiece with the cutting blade;
    the method comprising:
    a contact step of sliding the movable body relative to the housing so that the position of the cutting blade comes to a predetermined position in a direction to go away from the rotational axis, to bring the reference portion of the movable body and the position adjusting reference member into contact: and
    an adjusting step of, after the contact step, changing the relative position between the tool spindle and the position adjusting reference member by the at least one drive mechanism in a direction to come close each other to adjust the position of the cutting blade relative to the rotational axis.

2. The tool radius adjusting method in the machine tool in claim 1, wherein:
    the movable body is slidden by the supply of fluid relative to the housing in a direction in which the position of the cutting blade goes away from the rotational axis; and at the contact step, the movable body is slidden by the supply of fluid relative to the housing so that the position of the cutting blade comes to the predetermined position in the direction to go away from the rotational axis.

3. The tool radius adjusting method in the machine tool in claim 2, wherein:
the fluid is air;
a clearance is formed between the movable body and the housing; and
at the adjusting step, in adjusting the position of the cutting blade relative to the rotational axis, the fluid that has been supplied to slide the movable body relative to the housing in the direction in which the position of the cutting blade goes away from the rotational axis is discharged to the outside through the clearance.

4. The tool radius adjusting method in the machine tool in claim 2, wherein:
the housing is provided with a fluid receiving port which is supplied from the outside with the fluid used for sliding the movable body;
the machine tool is provided with an adjusting unit which comprises the position adjusting reference member and a fluid supply device for supplying the fluid to the fluid receiving port; and
the tool radius adjusting method further comprises a coupling step of coupling the fluid supply device to the fluid receiving port of the housing before the contact step.

5. A machine tool comprising:
a boring holder provided with a housing and a movable body supported on the housing to be slidable relative to the housing in a direction to cross a rotational axis direction and having a reference portion;
a cutting blade attached to the movable body;
a tool spindle rotatably supported on a spindle head and holding the housing;
a position adjusting reference member provided to be changeable in relative position to the tool spindle and provided to be contactable with the reference portion of the movable body;
at least one drive mechanism being able to change the relative position between the tool spindle and the position adjusting reference member and used for positioning the spindle head relative to a workpiece in machining the workpiece with the cutting blade; and
a control device for controlling the at least one drive mechanism to control the relative position between the tool spindle and the position adjusting reference member;
wherein in the state that the position of the cutting blade comes to a predetermined position in a direction to go away from the rotational axis and that the reference portion of the movable body and the position adjusting reference member are held in contact, the control device controls the at least one drive mechanism to adjust the position of the cutting blade relative to the rotational axis by changing the relative position between the tool spindle and the position adjusting reference member in a direction to come close to each other.

* * * * *